United States Patent [19]
Shibata et al.

[11] Patent Number: 6,031,637
[45] Date of Patent: Feb. 29, 2000

[54] FACSIMILE MACHINE WITH AUTOMATIC MODE SWITCHING FOR COMPUTER INTERFACING

[75] Inventors: Koichi Shibata; Mitsuhiro Nakamura, both of Osaka, Japan

[73] Assignee: Mita Industrial Co., Ltd., Osaka-fu, Japan

[21] Appl. No.: 08/966,779

[22] Filed: Nov. 10, 1997

Related U.S. Application Data

[63] Continuation of application No. 08/400,944, Mar. 8, 1995, abandoned.

[30] Foreign Application Priority Data

Mar. 15, 1994 [JP] Japan ................................. 6-044396

[51] Int. Cl.[7] .................................................... H04N 1/32
[52] U.S. Cl. ........................................ 358/468; 358/440
[58] Field of Search .................................. 358/468, 401, 358/434, 442, 450, 440, 405, 407, 441, 443; 355/313, 314; 395/113, 114

[56] References Cited

U.S. PATENT DOCUMENTS

| | | | |
|---|---|---|---|
| 4,702,630 | 10/1987 | Igi et al. ................................... | 400/82 |
| 4,905,098 | 2/1990 | Sakata ..................................... | 358/468 |
| 4,930,017 | 5/1990 | Izawa ...................................... | 358/296 |
| 4,992,884 | 2/1991 | Sakata ..................................... | 358/401 |
| 5,410,419 | 4/1995 | Muramatsu et al. ..................... | 358/468 |
| 5,448,378 | 9/1995 | Matsumoto .............................. | 358/468 |
| 5,450,213 | 9/1995 | Kobori .................................... | 358/450 |
| 5,586,185 | 12/1996 | Shibata et al. ........................... | 380/21 |
| 5,621,540 | 4/1997 | Terajima ................................. | 358/404 |
| 5,808,754 | 9/1998 | Itoh et al. ................................ | 358/440 |
| 5,847,843 | 12/1998 | Shibata et al. ........................... | 358/440 |

OTHER PUBLICATIONS

Bit Software, BitFax for Windows, 1992, pp. (3–1)–(3–10) & (7–4).

*Primary Examiner*—Jerome Grant, II
*Attorney, Agent, or Firm*—Jordan and Hamburg LLP

[57] ABSTRACT

A facsimile machine provided with a data processing device for executing data processing in communications mode in accordance with a command entered from a communications apparatus having a capability of transmitting and receiving communications data. The facsimile machine includes a mode select device for switching itself from ordinary facsimile mode for image data transmission and reception to communications mode for communications data transmission and reception in accordance with an operator input; an operation judgment device for judging whether the data processing device has accomplished a printing job, in which data received from the communications apparatus is printed on paper, after the mode select device has switched the facsimile machine to communications mode; and a mode reset device for resetting the facsimile machine to facsimile mode when completion of the printing job has been confirmed by the operation judgment device.

8 Claims, 13 Drawing Sheets

FACSIMILE MACHINE WITH AUTOMATIC MODE SWITCHING FOR COMPUTER INTERFACING

This application is a continuation of application Ser. No. 08/400,944 filed Mar. 8, 1995, now abandoned.

BACKGROUND OF THE INVENTION

This invention relates to a facsimile machine constructed to allow interconnection with a communications apparatus like a personal computer via an interface.

A facsimile modulator/demodulator (hereinafter referred to as FAX modem) is commercially available in recent years that can transmit data on a personal computer, external to the facsimile machine, to a remote facsimile machine via a telephone line. Used for connecting the personal computer to the telephone line, the FAX modem adds a capability of facsimile transmission and reception to conventional personal computer communications (hereinafter referred to as PC communications).

Since conventional facsimile machines are constructed to print out received image data on a real-time basis, it has not been possible to choose whether to print out the received data. Provision of a memory for storing outgoing and incoming data gives a facsimile machine a potential of expanding its functions.

As an example, the facsimile machine may be provided with an RS-232C interface and software that can handle AT commands. By connecting a personal computer to the facsimile machine via the RS-232C interface, a PC communications capability is added to the facsimile machine so that it can be utilized as a FAX modem or a printer for the personal computer.

The PC communications capability added to the facsimile machine as discussed above is independent of original functions of the facsimile machine. It is therefore necessary to provide a mode select switch on an operating panel of the facsimile machine, for example, for switching it between facsimile mode for performing the ordinary facsimile functions and communications mode for executing PC communications.

It is assumed that the print function in communications mode would normally be used just temporarily after switching the facsimile machine from facsimile mode to communications mode. Therefore, an operator should confirm that the facsimile machine is not currently used for facsimile transmission or reception and operate the mode select switch for switching from facsimile mode to communications mode when using the facsimile machine for a printing job. Upon completion of the printing job, the operator should again operate the mode select switch for returning the facsimile machine from communications mode back to facsimile mode.

It is to be noted that the personal computer and facsimile machine are placed separately from each other in most cases. This means that the operator needs to operate the mode select switch of the facsimile machine which is separated from the personal computer before and after the printing job. The need for such awkward switching operations could make it difficult to effectively use the printing function of the facsimile machine.

If the operator neglects to return the facsimile machine back to facsimile mode after the printing job, the facsimile machine is left in communications mode and it cannot receive messages transmit from other facsimile machines.

On the other hand, if the facsimile machine is so constructed that it is automatically reset to facsimile mode at the end of each data processing job in communications mode, frequent mode switching would be made even when the operator intends to perform successive jobs in communications mode. Therefore, automatic mode switching could prevent fast and smooth communication processes.

Another problem of the prior art is that the facsimile machine set to communications mode becomes inoperable as a peripheral device of the communications apparatus when the communications apparatus is not properly connected to the facsimile machine or the communications apparatus is powered off.

SUMMARY OF THE INVENTION

It is an object of the present invention to provide a facsimile machine which has overcome the aforementioned problems of the prior art.

It is another object of the present invention to provide a facsimile machine which can provide a capability of PC communications, yet allowing effective use of facsimile function and PC communications function by simple operation.

A facsimile machine of the present invention comprises data processing means for executing data processing in communications mode in accordance with a command entered from a communications apparatus having a capability of transmitting and receiving communications data: mode select means for switching the facsimile machine from ordinary facsimile mode for image data transmission and reception to communications mode for communications data transmission and reception in accordance with an operator input; operation judgment means for judging whether the data processing means has accomplished a printing job, in which data received from the communications apparatus is printed on paper, after the mode select means has switched the facsimile machine to communications mode: and mode reset means for resetting the facsimile machine to facsimile mode when completion of the printing job has been confirmed by the operation judgment means.

When switched from facsimile mode to communications mode by the mode select means, the facsimile machine performs a data processing job in accordance with a command entered from the communications apparatus. When the operation judgment means confirms that the command requesting printout of received data has been entered from the communications apparatus and the printing job has been completed, the facsimile machine is reset from communications mode to facsimile mode. This arrangement serves to prevent the facsimile machine from being unnecessarily kept in communications mode and provide efficient use of the facsimile machine without the need for complicated switch operations.

The facsimile machine of the invention may be constructed to further comprise mode resetting inhibit means for temporarily inhibiting automatic resetting from communications mode to facsimile mode by the mode reset means.

In this construction, the facsimile machine can temporarily inhibit automatic switching from communications mode to facsimile mode by the mode reset means upon completion of the printing job by the data processing means. It is therefore possible to prevent frequent mode switching, which is convenient when the operator intends to continue communications.

According to the invention, the communications apparatus may be provided with a capability to output a mode resetting command signal for resetting the facsimile machine from communications mode to facsimile mode; and the facsimile machine may be constructed to cancel inhibition of mode resetting by the mode resetting inhibit means when the mode resetting command signal is transmitted.

Provided with this additional feature, the facsimile machine can inhibit automatic switching from communications mode to facsimile mode by the mode reset means upon completion of the printing job by the data processing means until the mode resetting command signal is transmitted from the communications apparatus. With this arrangement, it is possible to reset the facsimile machine from communications mode to facsimile mode at an optimum point of time which is determined by the output timing of the mode resetting command signal.

The facsimile machine including the aforementioned mode resetting inhibit means may be constructed to further comprise command means for requesting automatic resetting to facsimile mode by the mode reset means, and to cancel inhibition of mode resetting by the mode resetting inhibit means upon confirming that the operator has operated the command means.

In this construction, the operator can determine whether to execute automatic mode resetting by operating, or not operating, the command means. This serves to promote efficient use of the facsimile machine.

The facsimile machine of the invention may be constructed to further comprise interface check means for checking whether there is any anomaly in interfacing between the communications apparatus and the facsimile machine; and warning means for producing a warning when the interface check means has detected an anomaly in interfacing.

In this construction, the interface check means checks for anomaly in interfacing between the communications apparatus and the facsimile machine and when an interface error is found, the warning means produces a warning. The operator is thereby prompted to take a corrective action for ensuring good interfacing status.

In one variation of the invention, the facsimile machine may be so constructed that the interface check means is caused to check for interfacing anomaly when the mode select means has been operated for switching the facsimile machine from facsimile mode to communications mode.

With this arrangement, it is possible to check for interfacing anomaly at an optimum point of time when the mode select means has been operated for using the facsimile machine as a peripheral device of the communications apparatus.

In another variation of the invention, the facsimile machine may be so constructed that the interface check means is caused to periodically check for interfacing anomaly when the mode select means has been operated for switching the facsimile machine from facsimile mode to communications mode.

With this arrangement, it is possible to simplify the construction of the interface check means for checking for interfacing anomaly at an optimum point of time when the mode select means.

These and other objects, features and advantages of the invention will become more apparent upon a reading of the following detailed description of preferred embodiments, which are illustrated in drawings.

DETAILED DESCRIPTION OF THE PREFERRED EMBODIMENTS OF THE INVENTION

Figure 1:
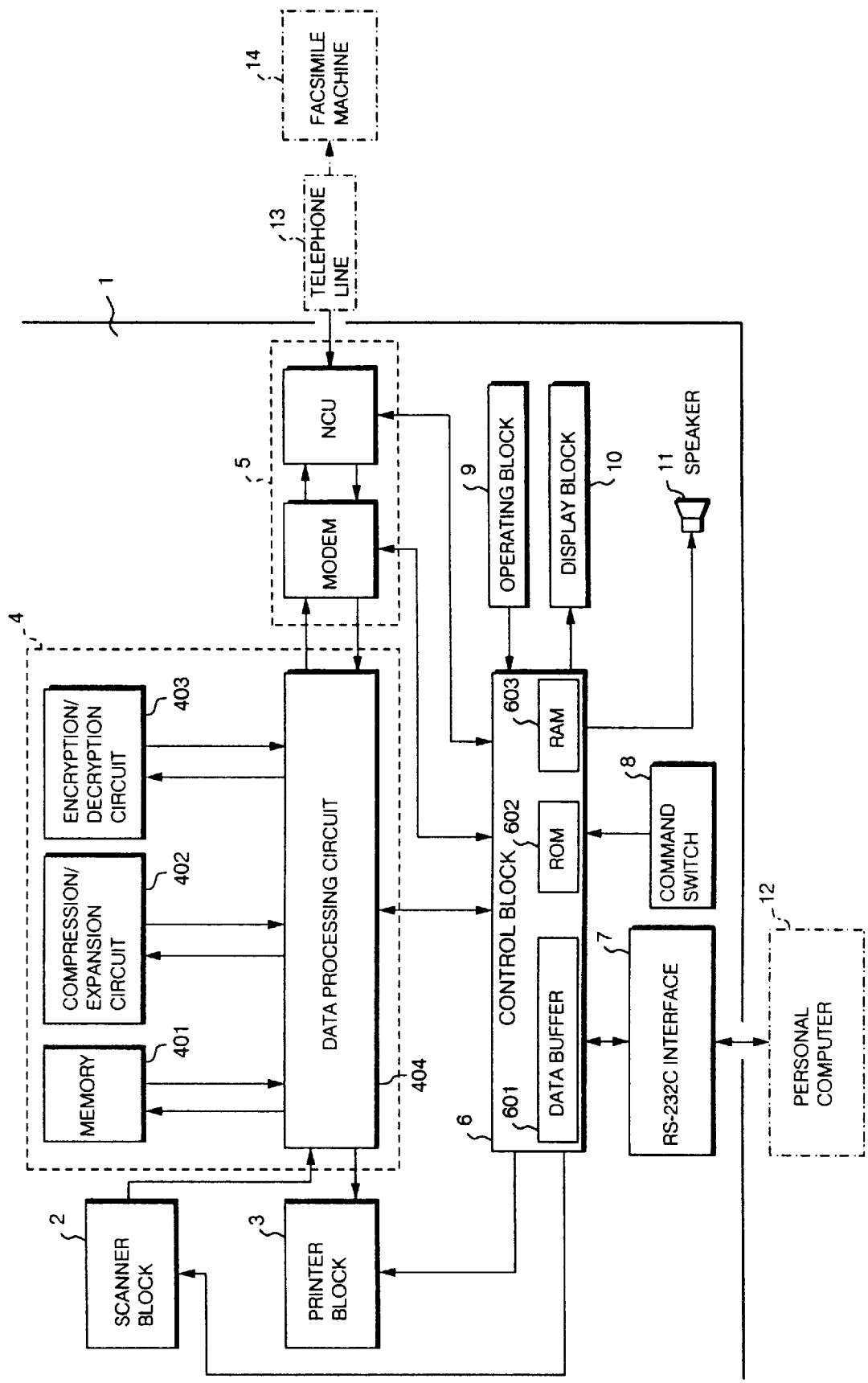
FIG. 1 shows a block diagram of a facsimile machine according to the invention.

The invention is now described as being embodied in a facsimile machine 1, referring to its block diagram shown in FIG. 1. The facsimile machine 1 is a G3-type facsimile machine constructed to enable high-speed transmission and reception of encrypted data.

The facsimile machine 1 has, in addition to the ordinary facsimile function, a capability to perform PC communications. For this purpose, the facsimile machine 1 is connected to a personal computer 12, which gives commands necessary for performing PC communications. It is to be noted that the facsimile machine 1 is not necessarily of G3 type, but may be of G4 or any other type as defined in industry standards.

The facsimile machine 1 comprises a scanner block 2 for reading an original image to be transmitted to other facsimile machine 14, a printer block 3 for printing image data read by the scanner block 2, image data received from the other facsimile machine 14 or data sent from the personal computer 12 on printing paper, a data processing block 4 for processing outgoing and incoming image data and communications data, a data transfer block 5 for transmitting and receiving data via a telephone line 13, and a control block 6 for controlling the scanner block 2, printer block 3, data processing block 4 and data transfer block 5.

The control block 6 of the facsimile machine 1 is connected to the personal computer 12 via an RS-232C interface 7. Although the present embodiment employs an interface conforming to the RS-232C standard, the type of the interface is not limited thereto as long as it allows communications between the facsimile machine 1 and personal computer 12.

The control block 6 comprises a data buffer 601 for temporary storage of communications data received from the personal computer 12, a read-only memory (hereinafter referred to as ROM) 602 which stores a processing program required for executing facsimile and PC communications functions and various kinds of data to be used for controlling light source intensity of the scanner block 2 and developing density and other operating conditions of the printer block 3 as well as for presentation of warnings and operating guidance messages, for instance, and a random access memory (hereinafter referred to as RAM) 603 which performs mathematical operations as prescribed in the processing program.

The ROM 602 also stores a communications program which enables interpretation of AT commands as well as Class 1 and Class 2 commands established and recommended by the Electronic Industries Association (known as EIA) of the United States. The facsimile machine 1 is made controllable by AT commands, Class 1 commands or Class 2 commands whichever entered from the personal computer 12. It is to be noted in this connection that the choice of commands is not limited to these three command systems. Whenever a new command system becomes an industry standard in future, such a command system may be installed in the facsimile machine 1 to ensure its general-purpose applicability.

The control block 6 also includes mode reset means which causes the facsimile machine 1 to be automatically reset from communications mode to ordinary facsimile mode. The facsimile machine 1 is temporarily used in a special way (e.g., as a printer) in communications mode. As soon as such a special use of the facsimile machine 1 is finished, the mode reset means automatically switches the facsimile machine 1 from communications mode to facsimile mode to prevent errors in receiving facsimile messages due to negligence or failure in mode resetting.

The facsimile machine 1 has a command switch 8 for selecting a desired command system. The command switch 8 may be configured with a dual-in-line switch (hereinafter referred to as a DIP switch), for example. As individual "bits" or switch segments of the DIP switch are set to represent a code corresponding to the desired command system, the code information is read and entered into the control block 6. The command system that controls communications with the personal computer 12 is thus selected in accordance with the setting of the command switch 8.

The facsimile machine 1 also comprises an operating block 9 including numeric keys and one-touch keys, a display block 10 including a liquid crystal display (hereinafter referred to as LCD) and light-emitting diodes (hereinafter referred to as LED's), and a speaker 11. Control signals for the operating block 9, display block 10 and speaker 11 are inputted to or outputted from the control block 6.

The scanner block 2 contains an automatic document feeder for transporting a loaded original document, an image pickup unit including a charge-coupled device (hereinafter referred to as CCD) line image sensor, and an image processing unit. The image pickup unit scans the original document line by line as it is transported by the automatic document feeder. Image data read from the original document is subjected to image processing including level compensation, gamma correction and analog-to-digital conversion, and delivered to the data processing block 4.

The printer block 3 is built to constitute a laser printer comprising a light projecting unit which emits a laser beam produced by converting a modulating signal derived from pixel data of an image to be printed (hereinafter referred to as print image), a photosensitive unit which produces a latent image when subjected to the laser beam emitted by the light projecting unit, a developing unit which develops the latent image formed on the photosensitive unit to create a visible print image, an image transfer unit which transfers the visible print image onto paper, and a fixing unit which fixes the transferred print image on the paper.

The data processing block 4 comprises a memory 401 for storing outgoing and incoming data, a compression/expansion circuit 402 for compressing and expanding data, an encryption/decryption circuit 403 for encrypting outgoing data and for decrypting incoming data, and a data processing circuit 404 for controlling the memory 401, compression/expansion circuit 402 and encryption/decryption circuit 403.

The memory 401 is a large-capacity memory device that can store images of about 100 pages of A4-size standard documents. This memory enables reception of a facsimile message while transmitting or receiving another message, reception of a confidential message, as well as scheduled transmissions. The compression/expansion circuit 402 compresses outgoing data and expands incoming data according to data compression methods as defined by Recommendation V.42bis of the International Telegraph and Telephone Consultative Committee (CCITT).

The encryption/decryption circuit 403 performs data encrypting and decrypting operations by using predefined cipher keys. The facsimile machine 1 thus constructed has the capability to encrypt and decrypt data by a substitution cipher method and to transmit and receive such data. More specifically, when outgoing data and a cipher key are entered from the data processing circuit 404, the encryption/decryption circuit 403 converts the data into ciphertext word by word using the cipher key. Also, the encryption/decryption circuit 403 converts incoming data encrypted word by word into plaintext.

The cipher keys are registered by individual users in a cipher key table stored in the RAM 603 of the control block 6. Shown in Table 1 is an example of cipher key table, which includes cipher numbers and 10-digit numerical cipher keys. The cipher numbers correspond to the previously mentioned index numbers of the cipher key table. It would be understood from Table 1 that 10 different cipher keys can be registered in this embodiment. A user of the facsimile machine 1 can register any arbitrary 10-digit numeral as a cipher key for each cipher number in Table 1. The user can also alter or delete cipher keys, should the need arise to do so. In the example of Table 1, no cipher keys are registered yet for cipher Nos. 3 and 9.

TABLE 1

| No. | Cipher Key |
|---|---|
| 1 | 0123456789 |
| 2 | 1112223334 |
| 3 | |
| 4 | 9856124385 |

TABLE 1-continued

| No. | Cipher Key |
| --- | --- |
| . | . |
| . | . |
| . | . |
| 9 | |
| 10 | 1467764135 |

The data processing circuit 404 applies prescribed data processing treatment to outgoing data, incoming data or communications data in accordance with control signals from the control block 6, and then transfers the data or print it out on printing paper.

As an example, facsimile transmission of an original document is executed in the following manner. As the scanner block 2 scans an original image, the 404 causes the memory 401 to temporarily store resultant Image data. When a transmission start timing signal is entered from the control block 6, the data processing circuit 404 reads the image data from the memory 401 and sends it to the compression/expansion circuit 402. Controlled by the data processing circuit 404, the compression/expansion circuit 402 compresses the image data at a specified compression ratio and the encryption/decryption circuit 403 encrypts the data in accordance with an encryption command from the control block 6. Then, the data processing circuit 404 outputs the encrypted image data to the data transfer block 5.

Facsimile transmission of communications data entered from the personal computer 12 is executed by the following procedure. The communications data is first sent to the data processing circuit 404 via the control block 6. In accordance with an encryption command from the control block 6, the data processing circuit 404 causes the encryption/decryption circuit 403 to encrypt the communications data and then outputs the encrypted data to the data transfer block 5.

In facsimile reception, the data processing circuit 404 delivers image data received via the data transfer block 5 to the memory 401 for temporary storage. When a print start timing signal is entered from the control block 6, the data processing circuit 404 reads the received data from the memory 401 and sends it to the compression/expansion circuit 402. Controlled by the data processing circuit 404, the encryption/decryption circuit 403 decrypts the data in accordance with a decryption command from the control block 6 and the compression/expansion circuit 402 expands the image data at a specified expansion ratio. Then, the data processing circuit 404 causes the printer block 3 to print out the received data.

If it is required to print out communications data entered from the personal computer 12 on printing paper, the communications data is sent to the printer block 3 via the control block 6 and data processing circuit 404.

The data transfer block 5 contains a modulator/demodulator (hereinafter referred to as modem) 501 for converting data from digital form to analog form, and vice versa, and a network control unit (hereinafter referred to as NCU) 502 for addressing other user terminals and establishing communications line connections.

The operating block 9 is used for entering facsimile numbers of other user terminals and facsimile transmission start/stop commands, for registering, altering and deleting cipher keys, for registering one-touch keys and simplified facsimile numbers, and for setting confidential message reception and various other operation modes.

One-touch keys and simplified facsimile numbers are registered for easy and quick transmission of facsimile messages to particular users. In this registration process, receiving users' facsimile numbers, accompanied by user names and cipher key numbers, as required, are memorized in a user terminal table preserved in the internal RAM 603 of the control block 6.

Table 2 shows an example of the user terminal table. One-touch key numbers in Table 2 correspond to the numbers marked on one-touch keys 16 of the operating block 9 shown in FIG. 2, or operation numbers used when sending facsimile messages. In this embodiment, up to 10 user terminals can be registered for the one-touch keys 16. In the example of Table 2, user names, facsimile numbers and cipher key numbers of recipients are registered for one-touch key Nos. 1, 5, 6 and 9 while nothing is registered for one-touch key Nos. 2, 4, 7 and 8. In addition, one-touch key Nos. 3 and 10 have only registered user names and facsimile numbers, but not any cipher key numbers.

The above cipher key numbers correspond to the cipher numbers shown in Table 1. As an example, cipher key "0123456789" corresponding to cipher No. 1 of Table 1 is registered for one-touch key No. 1 in Table 2. This cipher key is used for encrypting outgoing facsimile data or communications data and for decrypting incoming facsimile data or communications data. Registration of simplified facsimile numbers is done in a similar manner to that of one-touch key numbers.

TABLE 2

| No. | Recipient | Cipher Key No. | FAX No. |
| --- | --- | --- | --- |
| 1 | ABCD | 1 | 06-764-1111 |
| 2 | | | |
| 3 | XXXX | | 03-3456-7890 |
| 4 | | | |
| 5 | ΔΔΔΔ | 3 | 06-123-4567 |
| 6 | abcd | 7 | 06-987-6543 |
| 7 | | | |
| 8 | | | |
| 9 | ΔΔXX | 8 | 044-123-9876 |
| 10 | WXYZ | | 078-881-1212 |

The display block 10 includes an alphanumeric readout for indicating various kinds of text information such as recipient's name, facsimile number, activation/deactivation status of cryptographic communications, line connection and transmission status in facsimile transmission, entry data contents in cipher key and user terminal registration, ciper key non-registration status in encrypted facsimile reception and status of communications with the personal computer 12, as well as indicators for displaying communication error status, operation modes, quality of received images, memory-direct reception, maintenance request and so on.

The speaker 11 is used to generate an audible warning and to verbally communicate part of the aforementioned text information. As an example, an audible warning is generated at the end of facsimile transmission or at the start of facsimile reception. If it is found that a relevant cipher key is not registered when transmitting or receiving a facsimile message in cryptographic form, the speaker 11 generates a warning signal or verbal warning message indicating that the cipher key is not registered.

Figure 2:
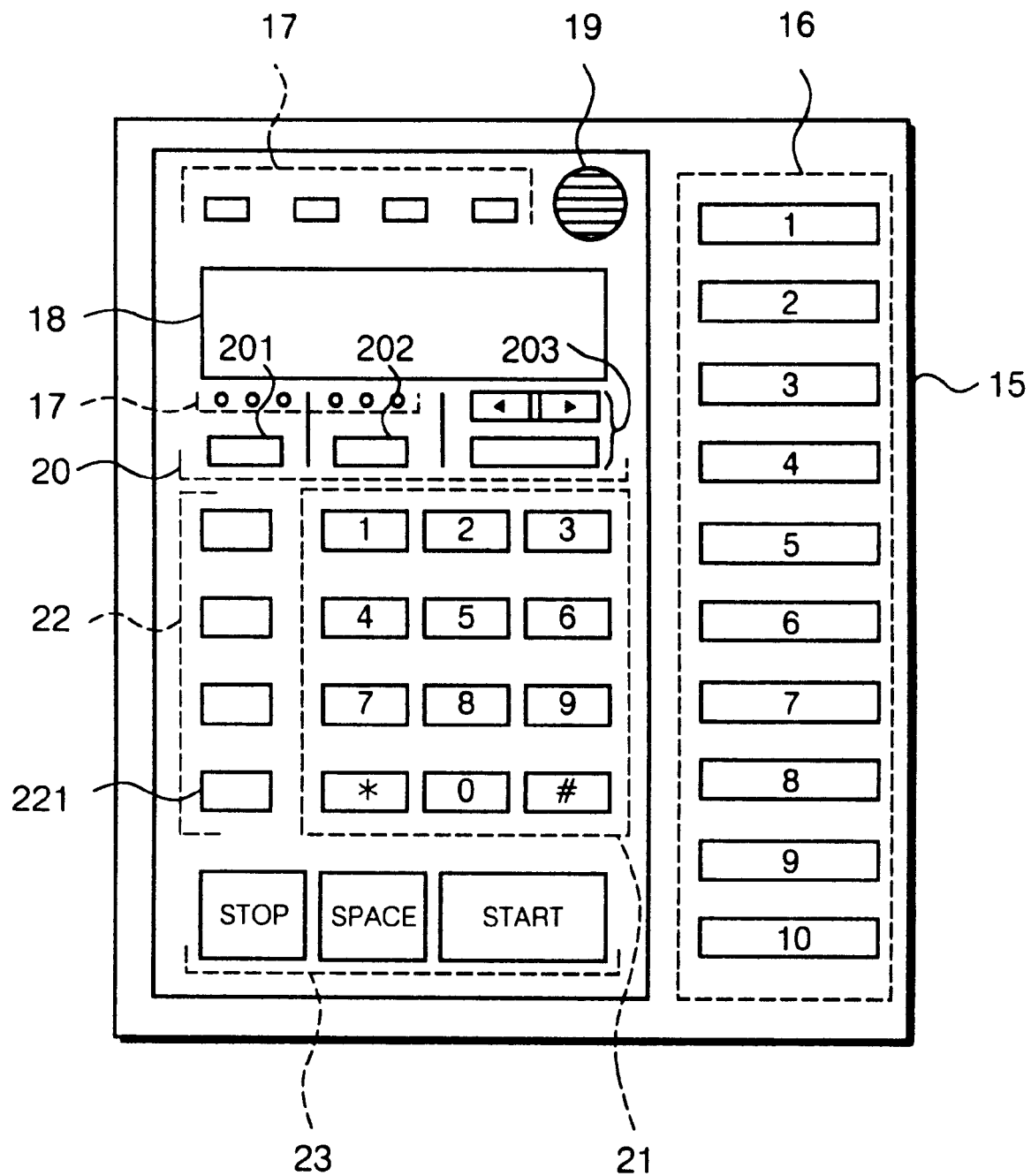
FIG. 2 is a diagram showing a construction of an operating block and a display block provided on an operator panel of the facsimile machine according to the invention.

The operating block 9, display block 10 and speaker 11 are provided on an operator panel 15 of the facsimile machine 1. As shown in FIG. 2, there are 10 one-touch keys 16 on the right-hand side of the operator panel 15. Numerals marked on the individual one-touch keys 16 represent the one-touch key numbers.

Provided on the upper-left portion of the operator panel 15 are an LCD readout 18 constituting part of the display block 10 for indicating text information, a plurality of LED indicators 17 arranged above and below the LCD readout 18 and a speaker grille 19. Below these facilities there are arranged select keys 20, numeric keys 21, function keys 22, start/stop keys 23 and so on.

The one-touch keys 16 are multi-function keys. They are configured to permit entry of not only one-touch key numbers but also text information such as recipients' names when registering one-touch keys and simplified facsimile numbers. The one-touch keys 16 are used for entering text information when input mode is switched by operating a function key 203 of the select keys 20.

The LED indicators 17 include a group of LED's for annunciating communication errors, memory-direct reception, confidential message reception, maintenance request and so on as well as another group of LED's for providing indications representative of selected functions of select keys 201 and 202.

The LCD readout 18 is constructed in such a manner that text information including a few tens of characters can be displayed on two lines. A plurality of "dots" are arranged in matrix at each character position so that the LCD readout 18 can show any desired characters by lighting appropriate dots.

The select keys 201 and 202 are used for setting printout density and halftone levels of received images, for selecting operation modes and for altering input mode of the multi-function keys for instance. As an example, the select keys 201 and 202 are used to adjust line density or halftone gradation levels of photographs.

The function key 203 is used for selecting various operation modes including cipher key registration mode for registering cipher keys and user terminal registration mode for registering data on communicating users. The numeric keys 21 are used for entering numeric values such as facsimile numbers, cipher numbers, cipher keys and simplified facsimile numbers.

The function keys 22 are keys for selecting various operations such as memory-direct reception by using the memory 401, ordinary facsimile transmission/reception mode (hereinafter referred to as facsimile mode) and pause/redial operations. At the location of the function keys 22, there is provided mode select means including a mode select key 221 for selecting control mode of the facsimile machine 1. If an operator turns on the mode select key 221, the facsimile machine 1 is switched from facsimile mode to communications mode for PC communications, and if the operator turns off the mode select key 221, the facsimile machine 1 is switched from communications mode to facsimile mode, for example.

The start/stop keys 23 are used to enter transmission start and stop commands when a facsimile message is transmitted after entering a complete facsimile number via the numeric keys 21. When a recipient is specified by using a one-touch key 16 or a simplified facsimile number, the recipient's facsimile number is automatically dialed to establish a communications line. In this case, a facsimile message is transmitted with no need for pressing the start key 23.

Referring again to FIG. 1, the RS-232C interface 7 is for connecting the facsimile machine 1 to the personal computer 12 via an RS-232C cable. There is provided an interface check circuit in the control block 6 for checking interface status (or whether communication is possible) between the facsimile machine 1 and personal computer 12 when communications mode is activated and while the facsimile machine 1 is operating in communications mode. If any interface error is detected, the display block 10 and speaker 11 produce audible and visual warnings.

Figure 3:
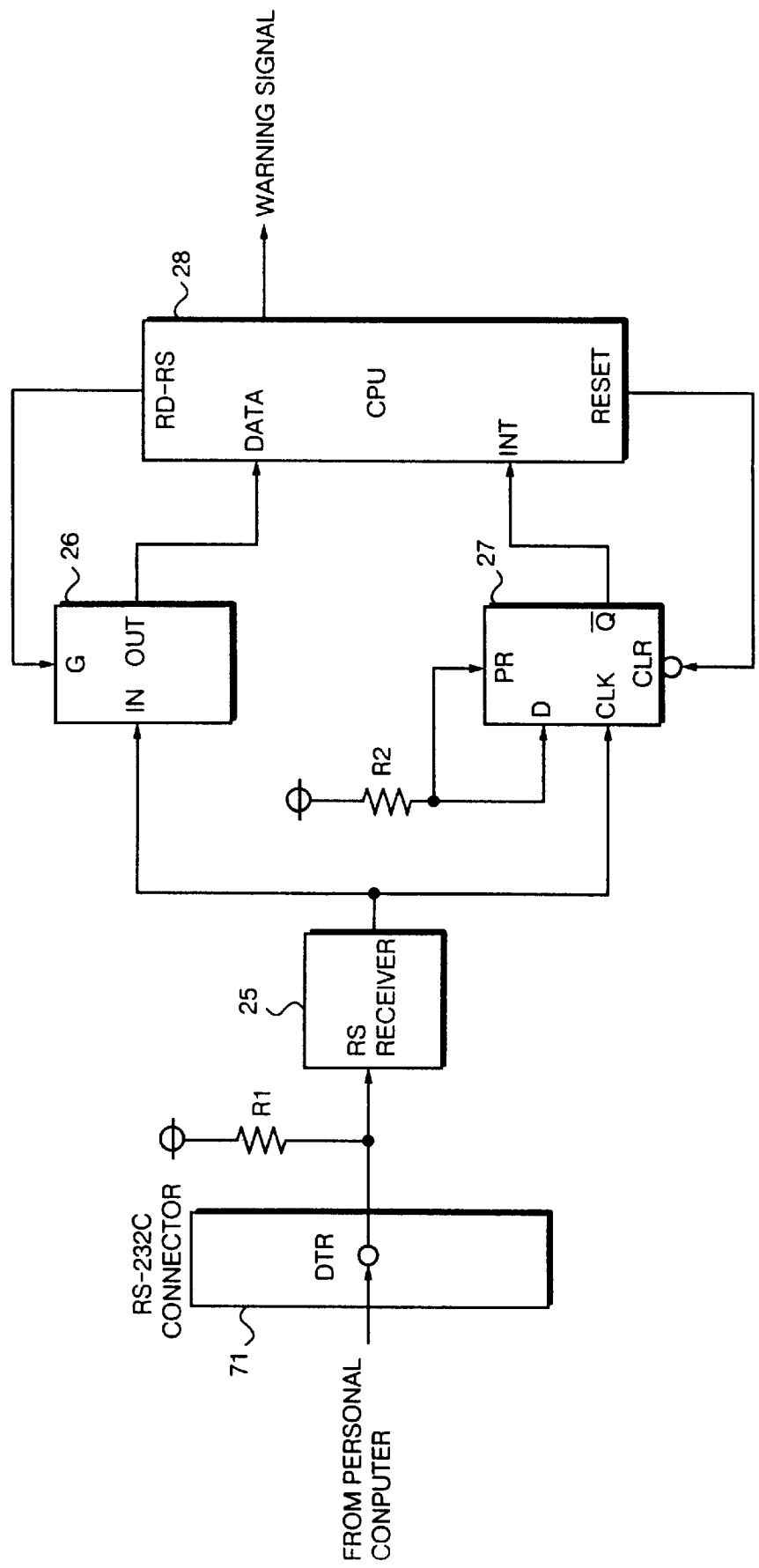
FIG. 3 is a circuit diagram of an interface check circuit for verifying interface status between the facsimile machine and a personal computer.

FIG. 3 is a circuit diagram showing an example of the interface check circuit. The interface check circuit shown in FIG. 3 is for detecting interface errors by examining a data terminal ready signal (hereinafter referred to as DTR signal) inputted from a DTR terminal of an RS-232C connector 71 of the RS-232C interface 7.

The DTR terminal of the RS-232C connector 71 is always pulled up to a High level by resistor R1. When the personal computer 12 connected to the RS-232C connector 71 via the RS-232C cable is powered on, the DTR terminal is turned to a Low level. In other words, the DTR signal is set to a Low level when communication with the personal computer 12 is enabled, a High level when communication with the personal computer 12 is disabled. Interface status errors can therefore be detected by checking the level of the DTR signal. Although Low level and High level DTR signal states represent communication-enabled and -disabled conditions in this embodiment, the interface check circuit may be constructed to use reversed signal states.

In FIG. 3, an RS receiver 25 converts the level of the DTR signal and delivers an output signal practically equivalent to the DTR signal. A gate circuit 26 is for feeding the DTR signal outputted from the RS receiver 25 to a DATA terminal of a central processing unit (hereinafter referred to as CPU) 28 when communications mode is selected. When a timing signal is entered to a gate terminal G, the gate circuit 26 outputs the DTR signal fed from its input terminal IN to its output terminal OUT.

The interface check circuit is constructed in such a manner that a DTR signal input timing signal is entered from an RD-RS terminal of the CPU 28 to the gate terminal G. When communications mode is selected by the mode select key 221, the CPU 28 transmits an input timing signal from the RD-RS terminal and receives the DTR signal. Then, the CPU 28 judges from the DTR signal level whether interfacing with the personal computer 12 is properly established. If interfacing with the personal computer 12 is judged abnormal, the CPU 28 causes the display block 10 to show a warning message indicating an interface error and the speaker 11 to generate an interface error alarm.

Figure 5:
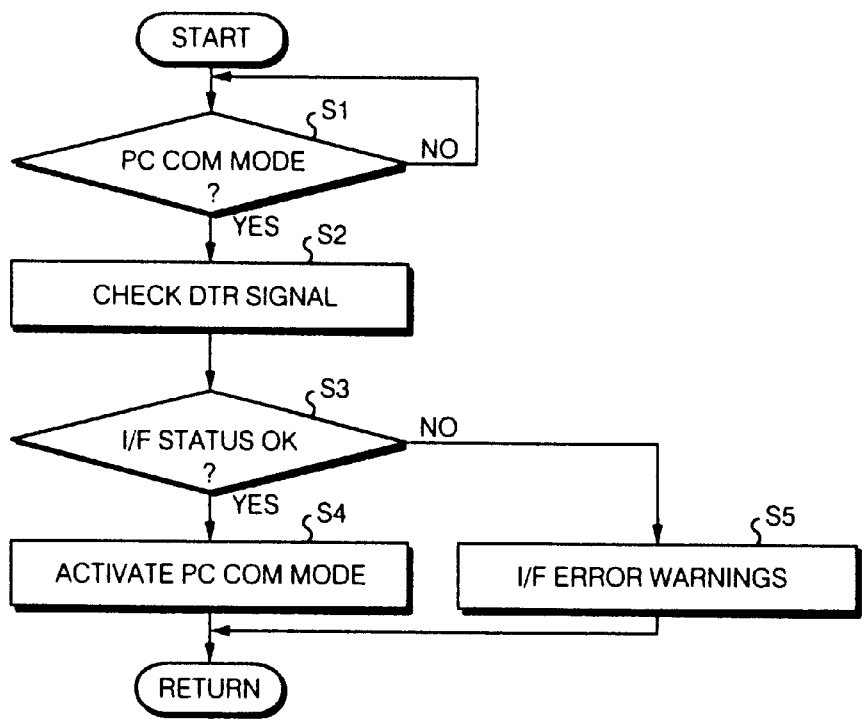
FIG. 5 is a flowchart showing a routine for checking interconnection with the personal computer for any interface errors when the facsimile machine is set to communications mode.
Figure 6:
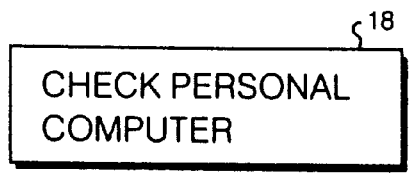
FIG. 6 is an example of warning message to be displayed in the event of an interface error.

FIG. 5 is a flowchart showing a routine for checking interconnection with the personal computer 12 for any interface errors when the facsimile machine 1 is switched to communications mode. If it is requested by the mode select key 221 to switch the facsimile machine 1 from facsimile mode to communications mode (YES in Step S1), the CPU 28 sends an input timing signal to the gate terminal G of the gate circuit 26 and receives a DTR signal in return (Step S2). Then, status of interfacing with the personal computer 12 is judged from the level of the DTR signal (Step S3). If interface status is satisfactory (YES in Step S3), communications mode is activated and the routine is finished (Step S4). If any interface error is found (NO in Step S3), the LCD readout 18 shows a warning message like the one shown in FIG. 6 and the speaker 11 generates an audible alarm to warn of an interface error status, and the routine is finished (Step S5). Although this embodiment produces both audible and visual warnings against interface errors, modification is possible to give audible-only or visual-only warning.

A D-type flip-flop (hereinafter referred to as D-FF) 27 is a circuit for entering level variations in the DTR signal outputted from the RS receiver 25 into an INT terminal of the CPU 28 in order that the CPU 28 can check the status of interfacing between the facsimile machine 1 and personal computer 12 in communications mode. An output signal of the RS receiver 25 is entered into a CLK terminal of the D-FF 27 and an output signal from a Q terminal of the D-FF 27 is entered into the INT terminal of the CPU 28. A D terminal and PR terminal of the D-FF 27 are set to a High level. A RESET signal outputted from a RESET terminal of the CPU 28 is inverted and applied to a CLR terminal of the D-FF 27 for resetting the Q terminal output of the D-FF 27.

Figure 4:
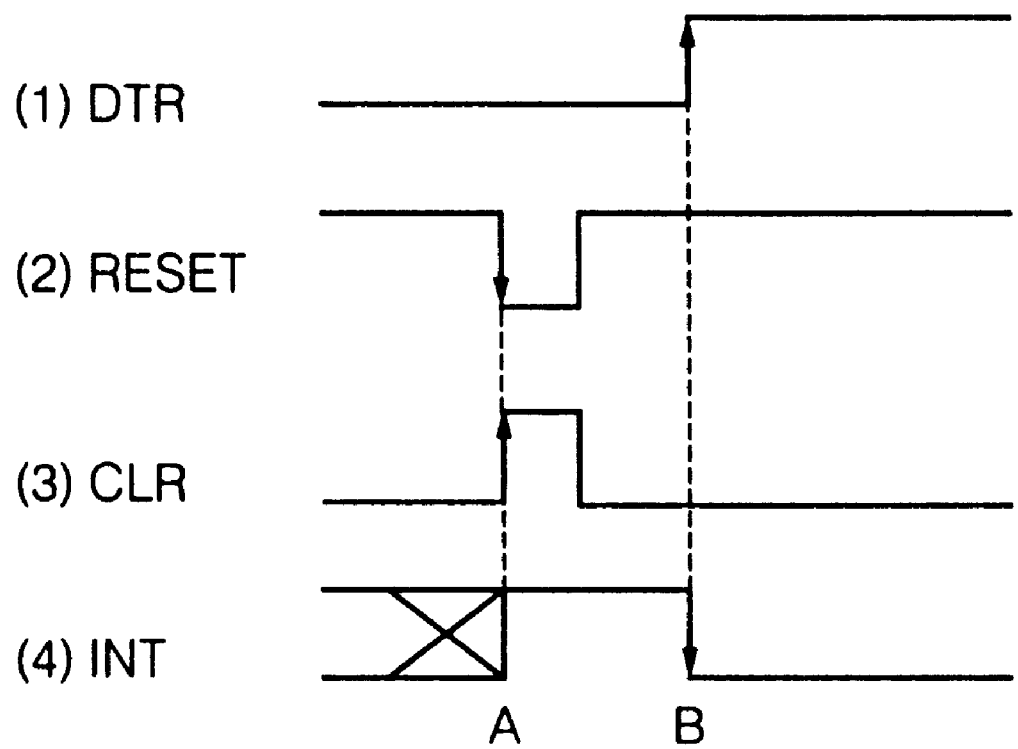
FIG. 4 is a time chart for explaining operation of the interface check circuit.

FIG. 4 is a time chart for explaining operation of the D-FF 27. First, the CPU 28 transmits a RESET signal to the D-FF 27 (point A in FIG. 4) to reset the Q terminal output of the D-FF 27. Then, a process of checking the status of interfacing between the facsimile machine 1 and personal computer 12 in communications mode is commenced. If the personal computer 12 is powered off or it becomes impossible to communicate with the personal computer 12 due to a breakage of a communications cable when the facsimile machine 1 in communications mode, for instance, the DTR signal changes from a Low level to a High level. At the rising edge of the DTR signal (point B in FIG. 4), an inverted signal (Low level) entered from the D terminal is outputted from the Q terminal of the D-FF 27 to the INT terminal of the CPU 28. Upon detecting an inversion (or a change from a High level to a Low level) of the input signal to the INT terminal, the CPU 28 judges that the personal computer 12 has changed from a communication-enabled state to a communication-disabled state. The CPU 28 then causes the display block 10 and speaker 11 to produce warnings.

Figure 7:
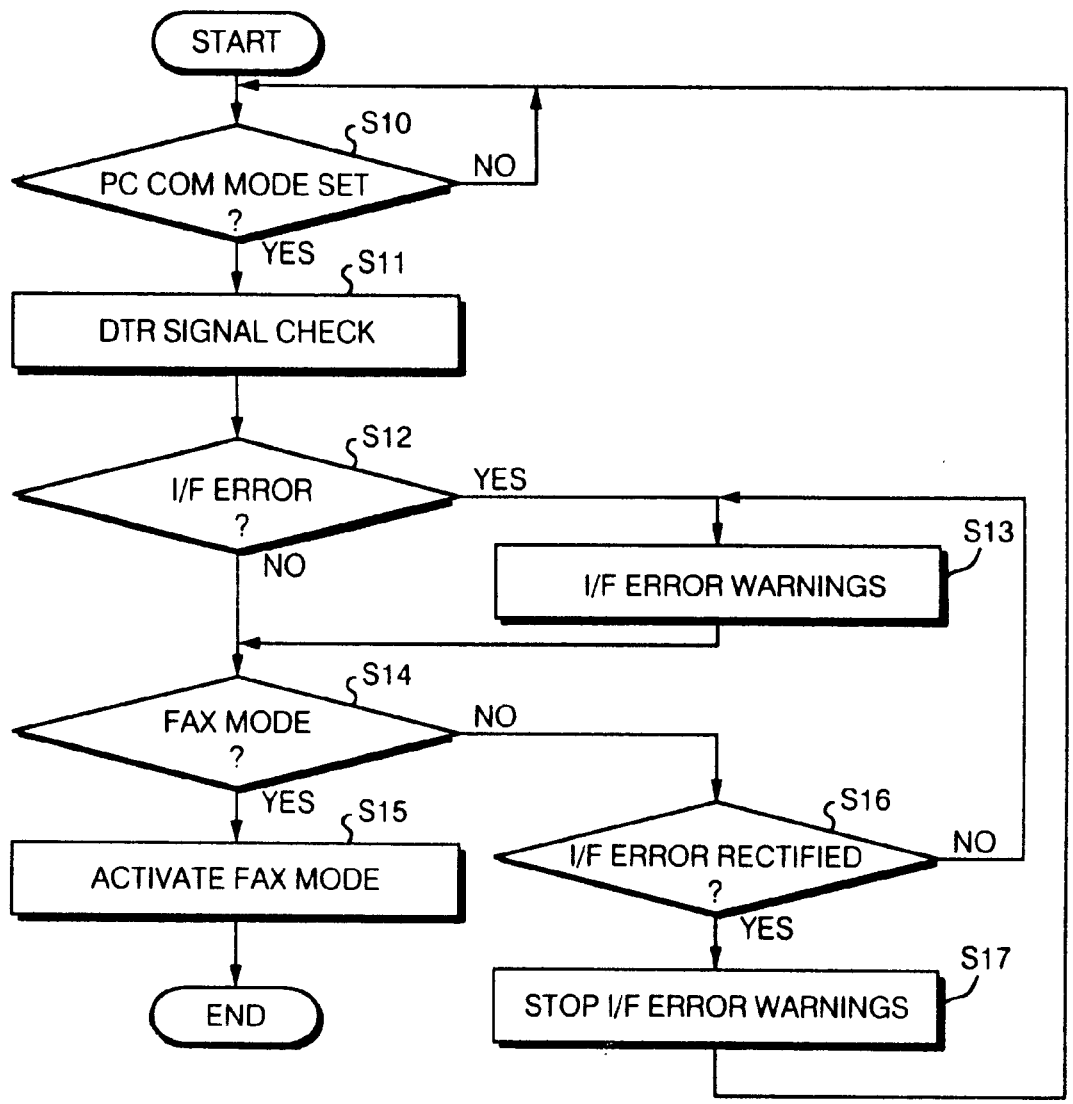
FIG. 7 is a flowchart showing a routine for checking interconnection with the personal computer for any interface errors after the facsimile machine has been set to communications mode.

FIG. 7 is a flowchart showing a routine for checking interconnection with the personal computer 12 for any interface errors after the facsimile machine 1 has been set to communications mode. When communications mode is selected by the mode select key 221 and the facsimile machine 1 is set to communications mode (YES in Step S10), a RESET signal is entered to the D-FF 27. After the Q terminal output of the D-FF 27 has been reset, a process of checking the DTR signal output from the Q terminal is commenced (Step S11).

In Step S12, it is judged from variations in the DTR signal level whether any error in interfacing with the personal computer 12 has occurred. If an interface error is found (YES in Step S12), the LCD readout 18 shows a warning message and the speaker 11 generates an audible alarm to warn of an interface error status (Step S13), and the operation flow proceeds to Step S14. If no interface error is found (NO in Step S12), the operation flow skips Step S13 and proceeds to Step S14.

In Step S14, a judgment is made as to whether it is requested by the mode select key 221 to switch the facsimile machine 1 to facsimile mode. If the judgment result is in the affirmative (YES in Step S14), facsimile mode is activated and the routine is finished (Step S15). If switching to facsimile mode is not requested (NO in Step S14), it is further judged from variations in the DTR signal level whether the interface error has been rectified (Step S16). If the interface error persists (NO in Step S16), the operation flow returns to Step S13 to reproduce the interface error warnings. If the interface error has already been rectified (YES in Step S16), the interface error warnings are stopped (Step S17) and the operation flow returns to Step S10, from where the above-described routine for detecting errors in interfacing with the personal computer 12 in communications mode is re-executed.

Although the facsimile machine 1 of the present embodiment continuously monitors the DTR signal to detect errors in interfacing with the personal computer 12 in communications mode, the facsimile machine 1 may be modified to perform periodic checking of the DTR signal for detecting interface errors. Such a modification is possible by reconfiguring the circuit of FIG. 3. As an example, after communications mode has been activated, an input timing signal may be entered to the gate terminal G of the gate circuit 26 at specified intervals to deliver the DTR signal to the DATA terminal of the CPU 28 so that the CPU 28 can verify the level of the DTR signal. In this modified form of embodiment, the D-FF 27 of FIG. 3 is no longer required so that the construction of the interface check circuit is simplified.

Figure 8:
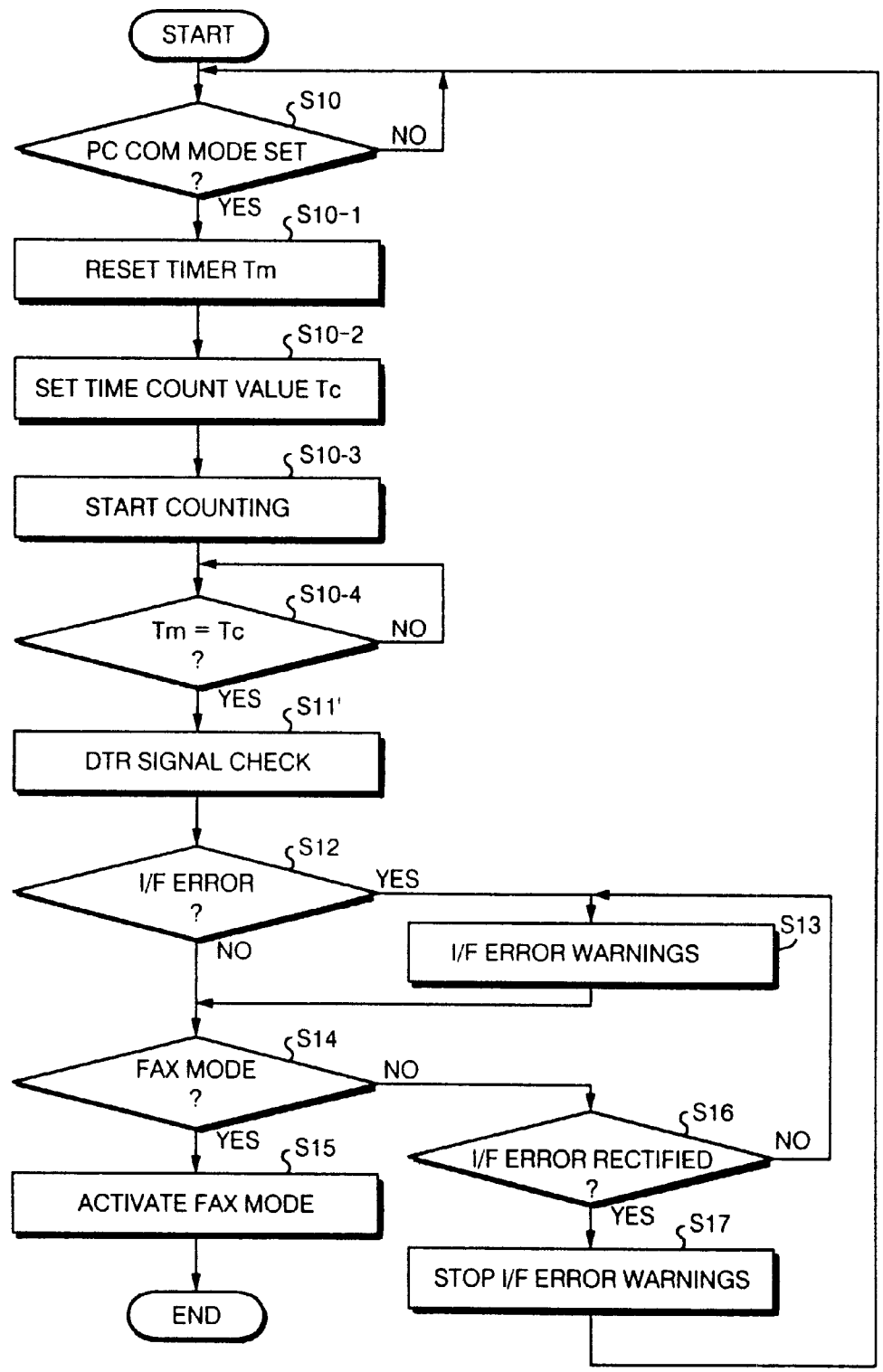
FIG. 8 is a flowchart showing a routine for periodically checking interconnection with the personal computer for any interface errors after the facsimile machine has been set to communications mode.

FIG. 8 is a flowchart showing a routine for periodically checking interconnection with the personal computer 12 for any interface errors after the facsimile machine 1 has been set to communications mode.

The flowchart of FIG. 8 differs from that of FIG. 7 on the following points. Firstly, Step S11 "START DTR SIGNAL CHECK" of FIG. 7 is replaced by Step S11' "DTR SIGNAL CHECK" in FIG. 8. Secondly, new Steps S10-1 to S10-4 are inserted between Steps S10 and S11'.

When communications mode is selected by the mode select key 221 and the facsimile machine 1 is set to communications mode (YES in Step S10), an internal timer Tm of the CPU 28 is reset, a time count value Tc is set, and then the timer Tm starts counting (Steps S10-1 to S10-3).

When the timer Tm has counted the set time Tc (YES in Step S10-4), an input timing signal is sent to the gate terminal G of the gate circuit 26 and the DTR signal is entered to the gate circuit 26 (Step S11'). At this point, it is judged from the DTR signal level whether any error in interfacing with the personal computer 12 has occurred (Step S12).

If an interface error is found (YES in Step S12), the facsimile machine 1 produces warnings against the interface error until the error is rectified (loop comprising Steps S12 to S16). When the error status is eliminated (YES in Step S16), the interface error warnings are stopped (Step S17) and the operation flow returns to Step S10, from where the above-described routine for detecting errors in interfacing with the personal computer 12 in communications mode is re-executed. If it is requested to switch the facsimile machine 1 to facsimile mode while interface error warnings are produced, facsimile mode is activated and the routine is finished (Step S15).

Figure 9:
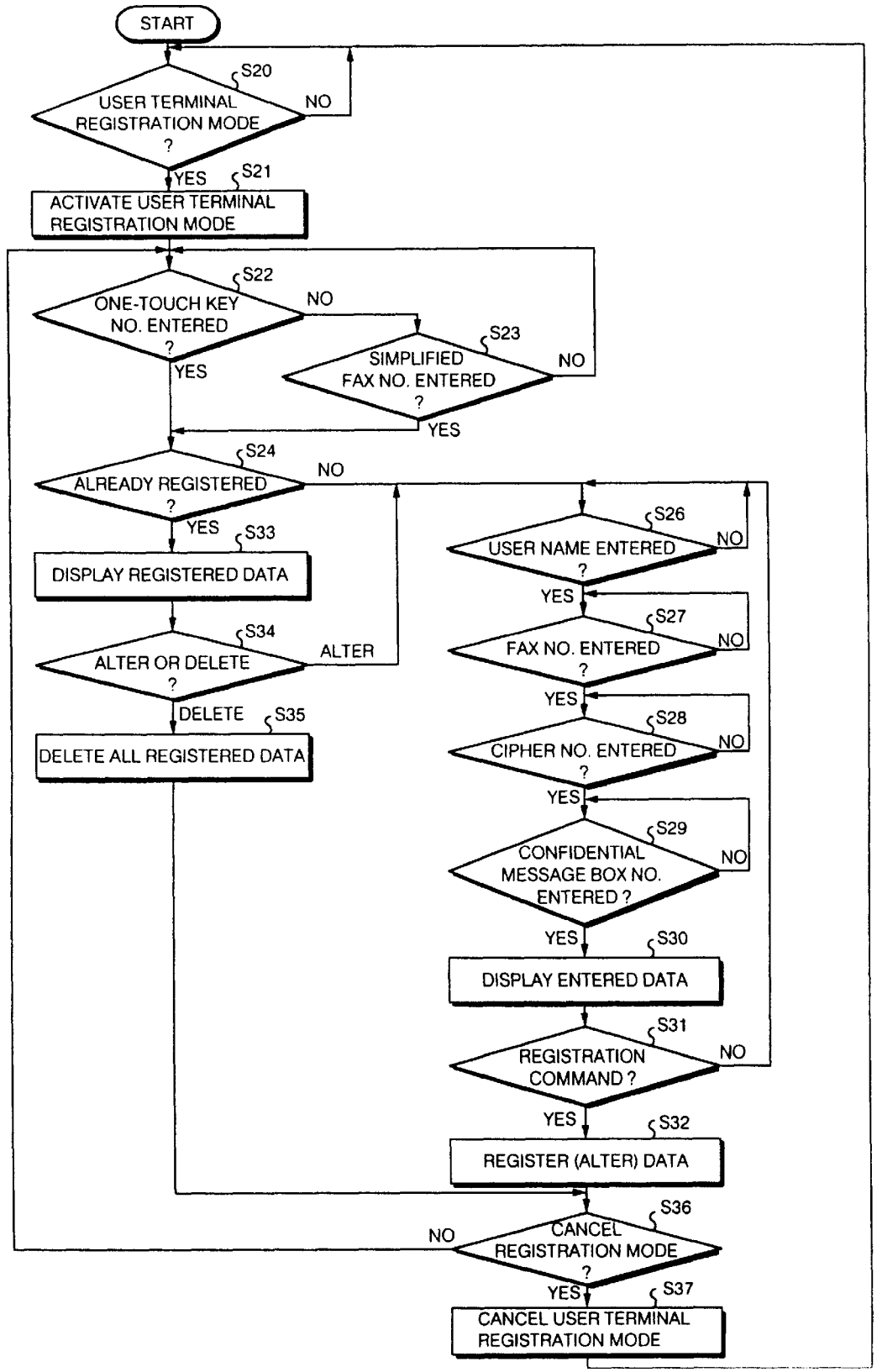
FIG. 9 is a flowchart showing operation in user terminal registration mode.

Referring now to FIG. 9, operation in user terminal registration mode is described in the following.

When user terminal registration mode is selected by the function key 203 (YES in Step S20), the facsimile machine 1 is set to user terminal registration mode (Step S21). Then, it is judged whether a one-touch key number or a simplified facsimile number has been entered (Steps S22 and S23). If the judgment result is in the affirmative (YES in Step S22 or S23), the user terminal table stored in the RAM 603 is verified to check whether the entered one-touch key number or simplified facsimile number is already registered (Step S24).

If the entered number is not registered yet (NO in Step S24), the operation flow proceeds to Step S26, where registration of the other communicating user terminal is started. Specifically, an operator is prompted to sequentially enter the communicating user name, facsimile number, cipher number, confidential message box number, etc. When entry of all these data has been completed (YES in Steps S26 to S29), the display block 10 displays the entered data for verification (Step S30). It is to be noted, however, that the cipher number and confidential message box number are optional items. If no numbers are entered for these items, it is judged that neither cryptographic communications nor confidential message reception will be executed, and the other items are registered.

The display block 10 displays the entered data contents until a registration command is given, allowing the operator to alter the data (loop comprising Steps S26 to S31). When the operator gives a registration command, the entered user name and other associated data are registered for the specified one-touch key number or simplified facsimile number in the user terminal table (Step S32), and the operation flow proceeds to Step S36.

On the other hand, if the entered number is already registered (YES in Step S24), the operation flow proceeds to Step S33, where alteration or deletion of the previously registered data is made. Specifically, after the display block 10 has presented the previously registered data contents, the operator is requested to alter or delete the registered data. If alteration of the registered data is requested by the function key 203, the operation flow proceeds to Step S26. Then, following the same procedure as used when registering new data, the previously registered numeric data in the user terminal table is altered to the newly entered number (Steps S26 to S32). If deletion of the registered data is requested by the function key 203, all the previously registered data is deleted (Step S35) and the operation flow proceeds to Step S36.

Next, it is judged whether cancellation of user terminal registration mode is requested (Step S36). If cancellation of user terminal registration mode is requested (YES in Step S36), user terminal registration mode is canceled (Step S37) and the operation flow returns to Step S20. If, however, cancellation of user terminal registration mode is not requested (NO in Step S36), the operation flow returns to Step S22, from where operation for user terminal registration is continued.

Figure 10:
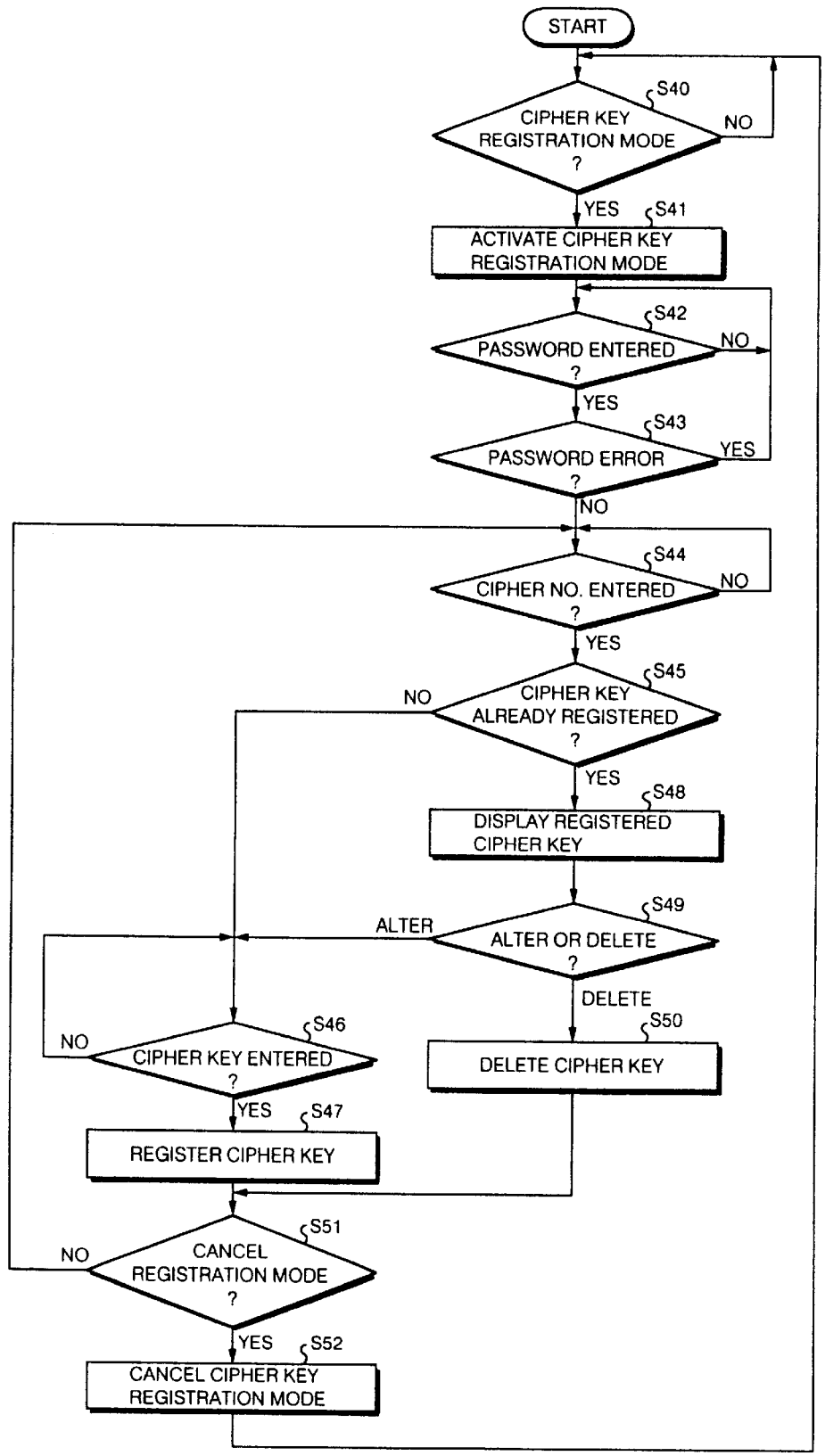
FIG. 10 is a flowchart showing operation in cipher key registration mode.

Referring now to FIG. 10, operation in cipher key registration mode is described in the following.

When cipher key registration mode is selected by the function key 203 (YES in Step S40), the facsimile machine 1 is set to cipher key registration mode (Step S41) and the operator is requested to enter a password. When the operator enters a correct password (YES in Step S42, NO in Step S43), it becomes possible to register cipher keys. At this point, the operator is requested to enter a cipher number. When the operator enters a cipher number (YES in Step S44). the cipher key table stored in the RAM 603 is verified to check whether the entered cipher number is already registered (Step S45).

If no cipher key is registered yet for the entered cipher number (NO in Step S45), the operation flow proceeds to Step S46, where registration of a new cipher key is performed. First, the operator is prompted to enter a cipher key. When a cipher key is entered (YES in Step S46), the cipher key is registered for the relevant cipher number in the cipher key table stored in the RAM 603 (Step S47). Then, the operation flow proceeds to Steps S51.

On the other hand, if a cipher key is registered for the entered cipher number (YES in Step S45), the operation flow proceeds to Step S48, where alteration or deletion of the previously registered data contents is made. Specifically, after the display block 10 has presented the previously registered cipher key data (Step S48), the operator is requested to alter or delete the registered data (Steps S49).

If alteration of the registered data is requested by the function key 203, the operation flow proceeds to Step S46. Then, a newly entered cipher key is registered for the specified cipher number, overwriting an existing cipher key in the cipher key table stored in the RAM 603 (Steps S46 and S47). If deletion of the registered data is requested by the function key 203, a previously registered cipher key is deleted (Step S50) and the operation flow proceeds to Step S51.

Next, it is judged whether cancellation of cipher key registration mode is requested (Step S51). If cancellation of cipher key registration mode is requested (YES in Step S51), cipher key registration mode is canceled (Step S52) and the operation flow returns to Step S40. If, however, cancellation of cipher key registration mode is not requested (NO in Step S51), the operation flow returns to Step S44, from where operation for cipher key registration is continued.

As seen above, registration, alteration and deletion of communicating users can be made independently of registration, alteration and deletion of cipher keys. Operations in user terminal registration mode and cipher key registration mode are therefore easy and simple.

As an example, even when no cipher key is registered for the specified cipher number in the cipher key table if it is intended to register or alter a one-touch key or simplified facsimile number, it is possible to register a cipher number in the user terminal table, without registering that cipher key for the cipher number concerned. Also, a cipher key already registered in the cipher key table may be deleted even when the relevant cipher number is assigned to an already registered one-touch key or simplified facsimile number, without deleting the cipher number registered in the user terminal table.

If a cipher key is not registered for the specified cipher number when an operator intends to perform cryptographic communications by using a one-touch key or simplified facsimile number, the operator is alerted to unregistered cipher key status and, then, the operator can register a desired cipher key as will discussed later.

Figure 11A:
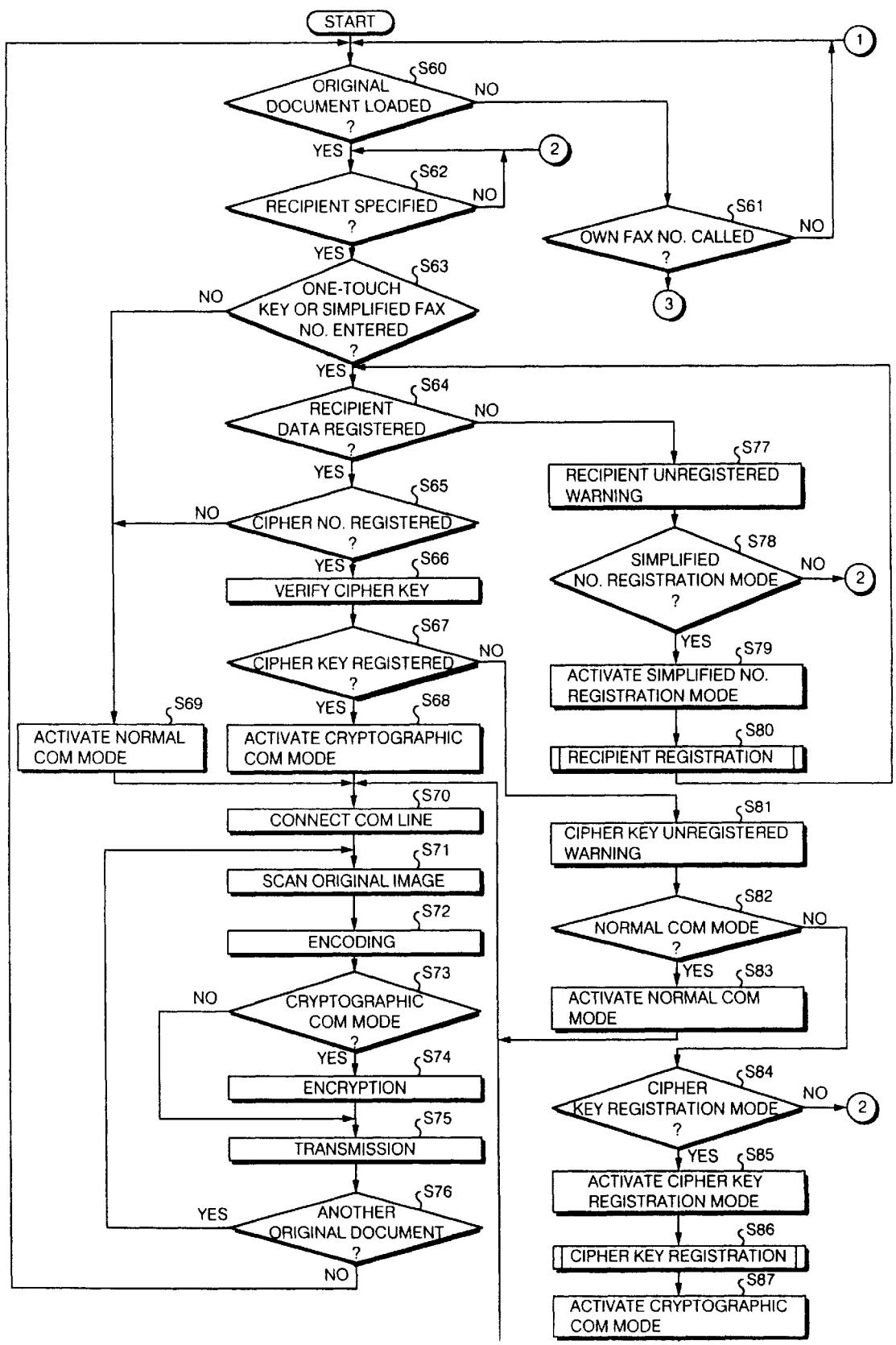
FIGS. 11A and 11B are a first part and a second part of a flowchart, respectively showing data transmission and reception processes in facsimile mode.
Figure 11B:
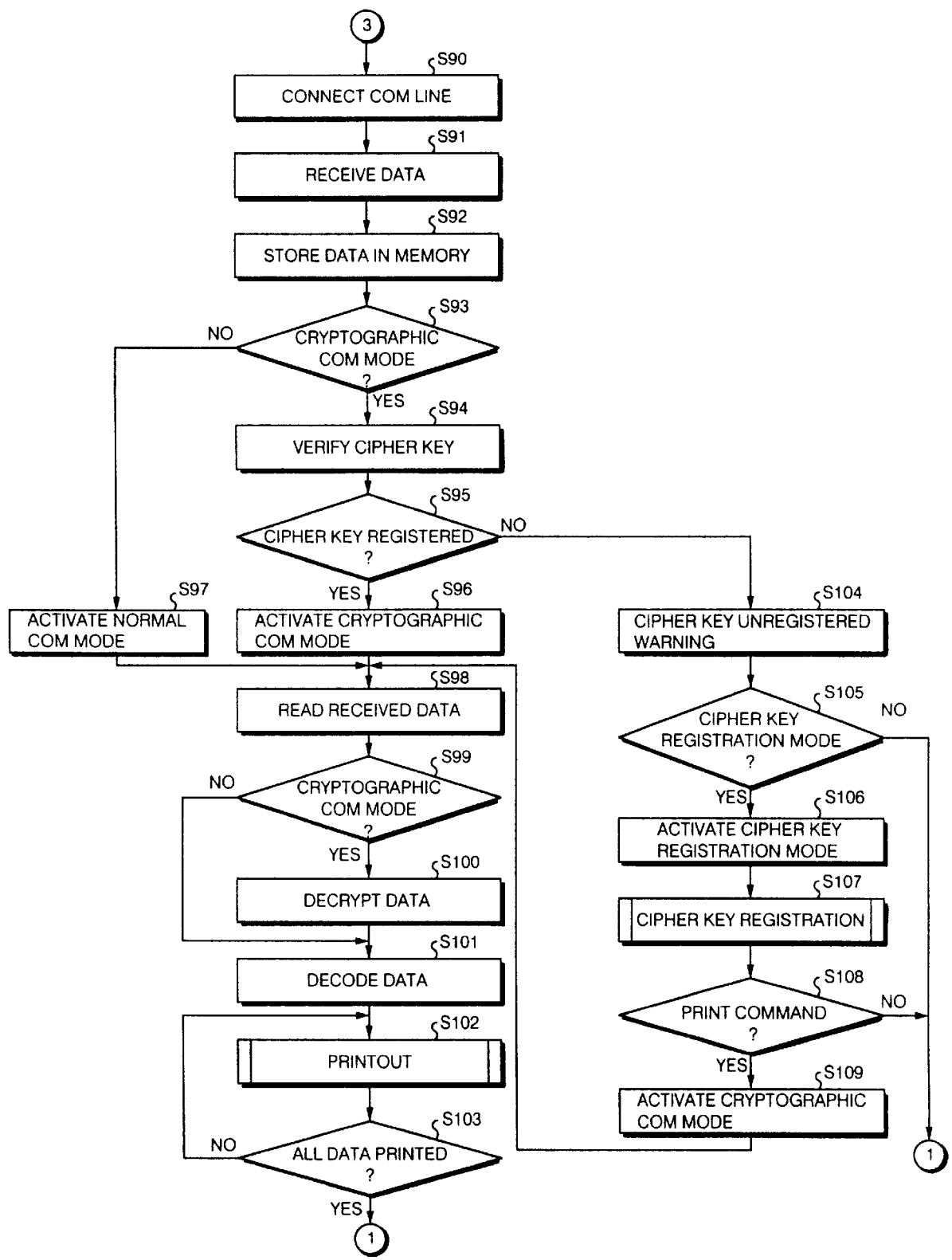

Referring now to FIGS. 11A and 11B, data transmit/receive operations in facsimile mode will be described in the following.

The facsimile machine 1 is initially set to facsimile mode upon power-on, and communications mode is activated by the operator when necessary. FIGS. 11A and 11B show an operating procedure to be followed by the facsimile machine 1 when it is set to facsimile mode.

When an original document is loaded to the facsimile machine 1 in facsimile mode (YES in Step S60), the operation flow proceeds to Step S62, from where a facsimile transmission process is executed. If own facsimile number is called (YES in Step S61), the operation flow proceeds to Step S61, from where a facsimile reception process is executed.

In facsimile transmission, the operator is requested to specify a recipient by entering an appropriate number (Step S62). When a number has been entered (YES in Step S62), it is judged whether the operator used a one-touch key 16 or simplified facsimile number (Step S63). If the recipient's facsimile number was entered with the numeric keys 21 without using any one-touch key 16 or simplified facsimile number (NO in Step S63), the facsimile machine 1 is set to normal communications mode, in which data is not encrypted (Step S69), and the operation flow proceeds to Step S70.

If the recipient's facsimile number was entered by using a one-touch key 16 or simplified facsimile number (YES in Step S63), the user terminal table stored in the RAM 603 is verified to check whether the relevant recipient is already registered (Step S64). If the recipient is not registered (NO in Steps S64), the operation flow proceeds to Step S77, where a process for registering a user terminal is performed.

Specifically, the operator is alerted to a recipient unregistered status in Step S77. The alerting includes, for example, an audible warning generated by the speaker 11 and such a message as "RECIPIENT UNREGISTERED" shown by the display block 10. Subsequently, it is judged whether the operator has chosen to activate user terminal registration mode by using the function key 203 (Step S78). If the judgment result is in the negative (NO in Step S78), the operation flow returns to Step S62. If the judgment result is in the affirmative (YES in Step S78), user terminal registration mode is activated (Step S79) and recipient data is registered (Step S80). Then, the operation flow proceeds to Step S64.

If the recipient is already registered (YES in Steps S64), a further judgment is made as to whether a cipher number is registered for the recipient (Step S65). If the cipher number is not registered (NO in Step S65), the operation flow proceeds to Step S69, where the facsimile machine 1 is switched to normal communications mode. If the cipher number is registered (YES in Step S65), the cipher key table stored in the RAM 603 is verified to judge whether a cipher key is registered for the cipher number concerned (Step S66).

If a cipher key is registered (YES in Step S67), the facsimile machine 1 is set to cryptographic communications mode (Step S68), and the operation flow proceeds to Step S70. If, however, no cipher key is registered (NO in Step S67), the operation flow proceeds to Step S81, where a process for registering a cipher key is executed.

Specifically, the operator is alerted to a cipher key unregistered status in Step S81. The alerting includes, for example, an audible warning generated by the speaker 11 and such a message as "CIPHER KEY UNREGISTERED" shown by the display block 10. Subsequently, it is judged whether normal communications mode has been chosen by operating the function key 203 (Step S82). If the judgment result is in the affirmative (YES in Step S82), normal communications mode is activated (Step S83), and the operation flow proceeds to Step S70 for executing facsimile transmission.

If normal communications mode is not chosen (NO in Step S82), it is further judged whether the operator has chosen to activate cipher key registration mode by operating the function key 203 (Step S84). If the judgment result is in the negative (NO in Step S84), the operation flow returns to Step S62. If the judgment result is in the affirmative (YES in Step S84), cipher key registration mode is activated (Step S85). After a cipher key has been registered (Step S86), the facsimile machine 1 is set to cryptographic communications mode (Step S87) and the operation flow proceeds to Step S70 for executing facsimile transmission.

In Step S70, the NCU 502 is connected to the recipient's facsimile machine 14 via the telephone line 13 and facsimile transmission of the original image is started. More particularly, the scanner block 2 scans the original image (Step S71) and the resultant image data (or outgoing data) is encoded by the data processing block 4 (Step S72).

Subsequently, it is judged whether the facsimile machine 1 is set to cryptographic communications mode (Step S73). If cryptographic communications mode is activated (YES in Step S73), the outgoing data is encrypted by a predefined encryption algorithm by using the cipher key corresponding to the specified cipher number (Step S74) and transmitted to the recipient's facsimile machine 14 via the data transfer block 5 and telephone line 13 (Step S75). If cryptographic communications mode is not activated (NO in Step S73), the outgoing data is transmitted without encryption to the recipient's facsimile machine 14 (Step S75).

Next, it is judged whether there is another original document to be transmitted (Step S76). If there is an original document (YES in Step S76), the operation flow returns to Step S71, from where the above-described process of original image scanning and transmission is re-executed. When there is no more original document loaded to the facsimile machine 1 (NO in Step S76), it is judged that the facsimile transmission process has been finished and the operation flow returns to Step S60.

In facsimile reception, the NCU 502 is connected to the transmitting facsimile machine 14 via the telephone line 13 (Step S90) and the facsimile machine 1 receives data transmitted from the facsimile machine 14 (Step S91). The received data is temporarily stored in the memory 401 (Step S92).

Then, it is judged whether the received data is encrypted (Step S93). If the data is not encrypted (NO in Step S93), the facsimile machine 1 is set to normal communications mode (Step S97) and the operation flow proceeds to Step S98, from where a process for printing out the received data is executed. If the received data is encrypted (YES in Step S93), the cipher key table stored in the RAM 603 is verified to judge whether a cipher key is registered for the transmitting user (Step S94).

If a cipher key is registered (YES in Step S95), the facsimile machine 1 is set to cryptographic communications mode (Step S96), and the operation flow proceeds to Step S98 for printing out the received data. If, however, no cipher key is registered (NO in Step S95), the operation flow proceeds to Step S104, from where a process for registering a cipher key is executed.

Specifically, the operator is alerted to a cipher key unregistered status in Step S104. The alerting includes, for example, an audible warning generated by the speaker 11 and such a message as "CIPHER KEY UNREGISTERED" shown by the display block 10. Subsequently, it is judged whether cipher key registration mode has been chosen by operating the function key 203 (Step S105). If the judgment result is in the negative (NO in Step S105), the operation flow proceeds to Step S60 without printing the received data.

If cipher key registration mode is chosen (YES in Step S105), cipher key registration mode is activated (Step S106) and a cipher key is registered (Step S107). Then, it is judged whether the operator has entered a command to print the received data by operating the function key 203 (Step S108). If there is no print command (NO in Step S108), the operation flow returns to Step S62 without printing the received data. If there is a print command (YES in Step S108), the facsimile machine 1 is set to cryptographic communications mode (Step S109) and the operation flow proceeds to Step S98, from where a process for printing out the received data is executed.

In Step S98, the received data is read out from the memory 401. Then, it is judged whether the facsimile machine 1 is set to cryptographic communications mode (Step S99). If the judgment result is in the affirmative (YES in Step S99), the data processing block 4 decrypt the received data (Step S100), and the data is decoded (Step S101). If the judgment result is in the negative (NO in Step S99), the decryption process of Step S100 is skipped and the received data is decoded in Step S101.

The received data is then printed out on paper by the printer block 3 (Step S102). When one page of the received data has been printed out, it is judged whether printout of all the received data has been finished (Step S103). If printout of the received data has not been completed (NO in Step S103), the operation flow returns to Step S102 to print the next page of the received data. When all pages of the received data have been printed out (YES in Step S103), it is judged that the facsimile reception process is finished and the operation flow returns to Step S62.

As seen above, if the operator attempts to send a facsimile message when a recipient is not registered for a particular one-touch key or simplified facsimile number in facsimile mode, the facsimile machine 1 produces user terminal unregistered warnings and the operator is allowed to register the recipient before transmitting the facsimile message. With this construction, it is possible to transmit the facsimile message by simple operation even when the recipient is not pre-registered for the one-touch key or simplified facsimile number.

When transmitting or receiving encrypted image data in facsimile mode to or from another user for whom a cipher key is not registered, the facsimile machine 1 produces cipher key unregistered warnings and the operator is allowed to register a cipher key before transmitting or receiving the image data. With this construction, it is possible to transmit or receive the encrypted image data by simple operation even when the cipher key is not pre-registered.

Figure 12:
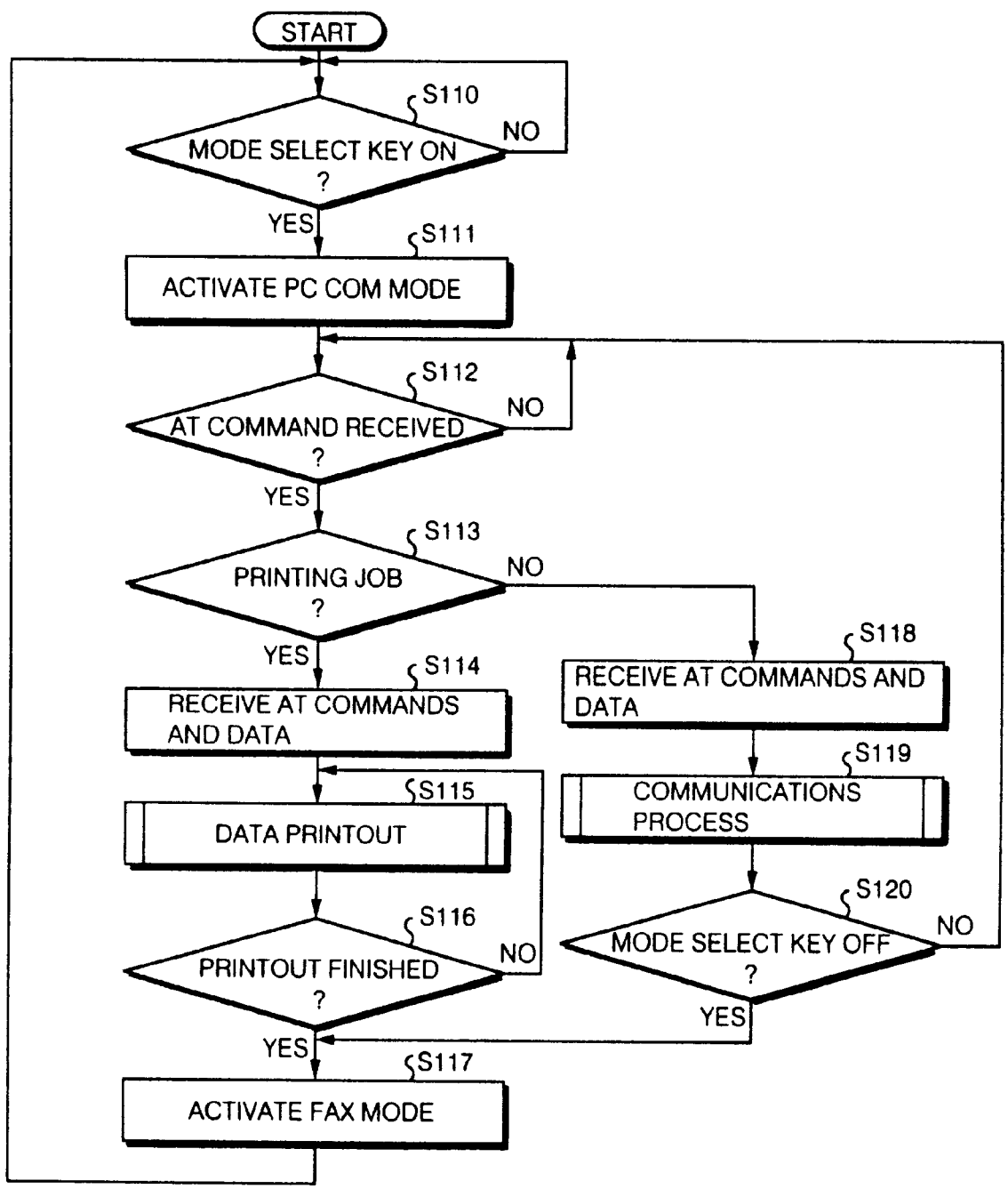
FIG. 12 is a flowchart showing how the facsimile machine is switched to facsimile mode upon completion of printout in communications mode according to one embodiment of the invention.
Figure 13:
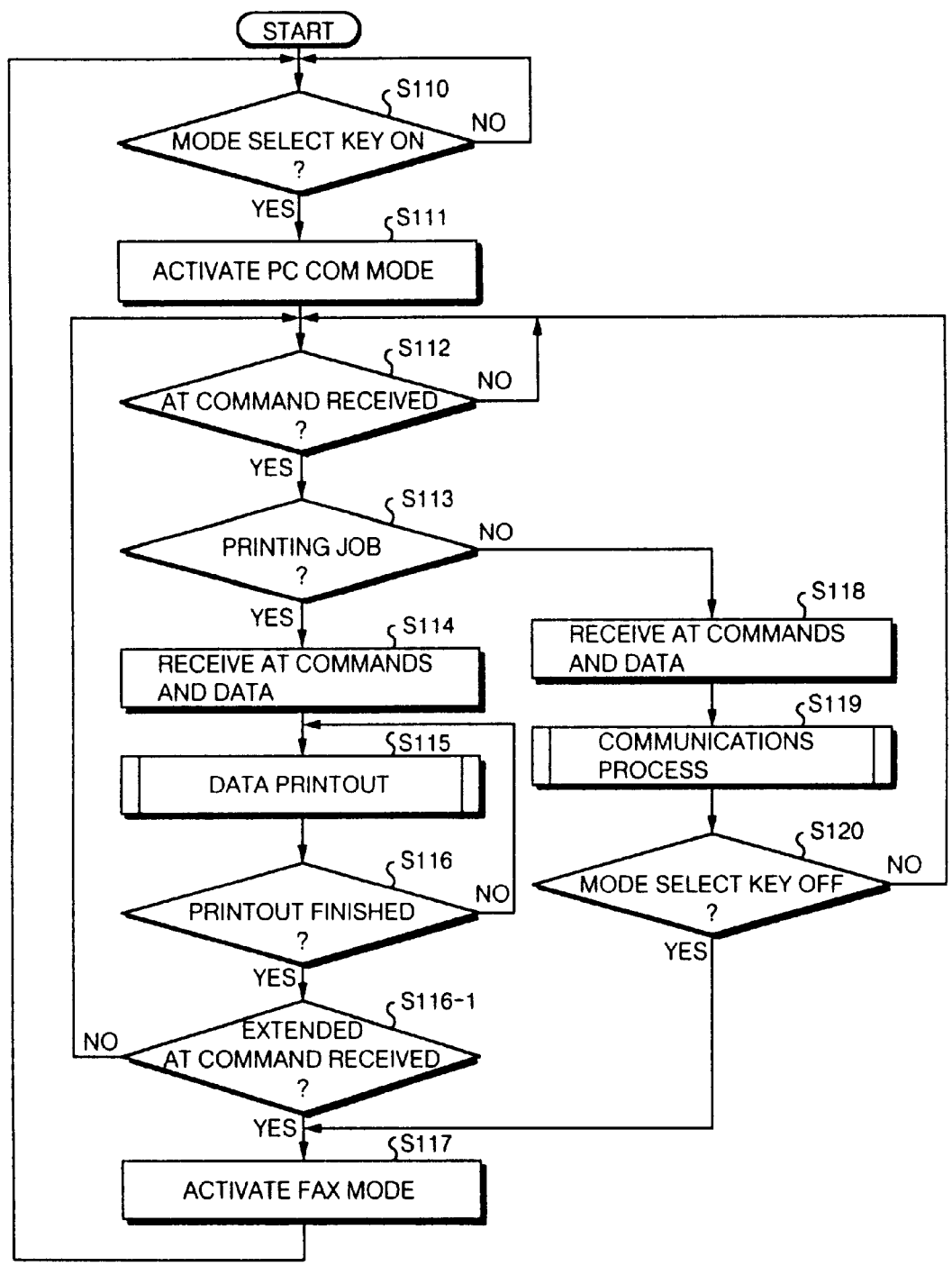
FIG. 13 is a flowchart showing how the facsimile machine is switched to facsimile mode upon completion of printout in communications mode according to another embodiment of the invention.

Referring now to FIGS. 12 and 13, switching between facsimile mode and communications mode is described.

FIG. 12 is a flowchart showing how the facsimile machine 1 is switched to facsimile mode upon completion of printout in communications mode according to one embodiment of the invention.

The facsimile machine 1 has a print function, in which the facsimile machine 1 is pre-assigned with a specific facsimile number. Upon receiving communications data addressed to that facsimile number, the facsimile machine 1 handles the communications data in the same way as image data received in facsimile mode and prints the data on printing paper. In a modified form of the embodiment, an extended AT command system may be produced so that printout of communications data sent to the facsimile machine 1 is controlled by using extended AT commands.

In communications mode, the facsimile machine 1 is placed under the control of the personal computer 12. This means that the facsimile machine 1 performs various jobs in accordance with commands entered from the personal computer 12. Although the facsimile machine 1 works independent of the personal computer 12 in facsimile mode, it becomes a peripheral device of the personal computer 12 in communications mode.

The facsimile machine 1 works in different ways depending on which operation mode is selected communications mode provides a supplementary function to the facsimile machine 1 for supporting communications with the personal computer 12 and facsimile mode should be considered as main mode of the facsimile machine 1. It is expected that the print function for printing out communications data would normally be used just temporarily upon switching the facsimile machine 1 from facsimile mode to communications mode. Therefore, the present embodiment is constructed in such a manner that the facsimile machine 1 is automatically reset to its main mode (or facsimile mode) when a printing job in communications mode has been completed. This construction would serve to improve operating efficiency in facsimile mode.

When communications mode is selected by the mode select key 221 (YES in Step S110), the facsimile machine 1 is set to communications mode (Step S111) and becomes ready to perform PC communications.

When an AT command is received from the personal computer 12 (YES in Step S112), it is judged whether a printing job is requested by the received AT command (Step S113). If a printing job is requested (YES in Step S113), a set of AT commands for execution of the printing job and communications data are received (Step S114). Then, the printer block 3 sequentially prints out the incoming data on printing paper (loop comprising Steps S115 and S116). When the printing job is completed (YES in Step S116), the facsimile machine 1 is automatically switched from communications mode to facsimile mode (Step S117) and the operation flow returns to Step S110.

If a printing job is not requested in Step S113, a set of AT commands and communications data are received (Step S118) and a specified communications process is carried out in accordance with the received AT commands (Step S119). Next, it is judged whether facsimile mode is selected by the mode select key 221 in Step S120. If facsimile mode is selected (YES in Step S120), the operation flow proceeds to Step S117, where the facsimile machine 1 is set to facsimile mode (Step S117) and the operation flow returns to Step S110. If facsimile mode is not selected (NO in Step S120), the facsimile machine 1 remains in communications mode and the operation flow returns to Step S112, where the facsimile machine 1 waits for a next command.

As seen above, the facsimile machine 1 is so constructed that a printing job is executed in accordance with AT commands sent from the personal computer 12 only when the facsimile machine 1 is switched from ordinary facsimile mode to communications mode by the mode select means comprising the mode select key 221 and the facsimile machine 1 is switched to facsimile mode immediately after confirming that the printing job has been completed. With this arrangement, the facsimile machine 1 is automatically switched from communications mode to facsimile mode after executing PC communications, and there is no need to operate the mode select key 221 of the facsimile machine 1 which is placed apart from the communications system including the personal computer 12. This would serve to allow efficient use of the facsimile machine 1.

Unlike a conventional facsimile machine which remains in communications mode unless a mode select switch is operated, the facsimile machine 1 is automatically reset to facsimile mode upon completing a printing job in communications mode so that it can receive image data transmitted from the other facsimile machine 14 without failure.

According to the above-described embodiment, the facsimile machine 1 is unconditionally switched back to facsimile mode upon completion of the printing job. The embodiment may be modified to include mode resetting inhibit means which inhibits automatic switching from communications mode to facsimile mode until a mode resetting command signal is outputted from the personal computer 12, as shown in FIG. 13. More particularly, the flowchart of FIG. 13 contains an additional Step (S116-1) for judging whether the personal computer 12 has outputted a mode resetting command signal including an extended AT command after Step S116 shown in the flowchart of FIG. 12.

The aforementioned extended AT command is a user-defined command added to the standard AT command system. The extended AT command used in Step S116-1 is a command for switching the facsimile machine 1 from communications mode to facsimile mode upon completion of a printing job. This extended AT command is added to the end of a set of AT commands for execution of the printing job and sent to the facsimile machine 1.

In FIG. 13, the facsimile machine 1 is set to communications mode and receives a set of AT commands concerning the printing job and data in Steps S110 to S114. Upon completion of printout of the received data (Steps S115 and S116), it is judged whether the extended AT command ATY8 requesting automatic mode switching has been received (Step S116-1). If automatic mode switching of the facsimile machine 1 is requested (YES in Step S116-1), the facsimile machine 1 is set to facsimile mode (Step S117) and the operation flow returns to Step S110. If, however, automatic mode switching of the facsimile machine 1 is not requested (NO in Step S116-1), the facsimile machine 1 remains in communications mode and the operation flow returns to Step S112, where the facsimile machine 1 waits for a next command.

Although the embodiments of FIGS. 12 and 13 employ the AT command system, it is possible to handle the communications process by the use of other suitable command systems.

As seen above, the facsimile machine 1 is constructed to inhibit its switching from communications mode to facsimile mode until a mode resetting command signal is outputted from the personal computer 12. According to this construction, it is possible to effectively prevent deterioration of operating efficiency due to frequent switching from communications mode to facsimile mode that will otherwise occur upon completion of printout even when the operator intends to stay in communications mode.

In an alternative form of the invention, the function keys 22 may include a command key that will constitute command means for choosing whether to perform automatic resetting of the facsimile machine 1 from communications mode to facsimile mode so that automatic mode resetting is made only when it is requested by operating the command means, and otherwise inhibited by the mode resetting inhibit means. With this alternative construction, the flowchart of FIG. 13 should be modified so that a judgment is made in Step S116-1 to check whether automatic mode resetting is requested by the command means.

According to the embodiment described above, the facsimile machine 1 is provided with interface check means comprising the interface check circuit for verifying interface status between the facsimile machine 1 and personal computer 12, and when an interface error is found, the warning means comprising the display block 10 and speaker 11 produce audible and visual warnings. With this arrangement, it is possible to take an appropriate remedial action immediately when an interface error occurs in communications mode. This serves to reduce time periods during which the facsimile machine 1 does not actually function in communications mode and enable efficient use of the facsimile machine 1.

Furthermore, the above embodiment is so constructed that the interface check means checks for interface errors after confirming that the operator has operated the mode select means comprising the mode select key 221 for switching the facsimile machine 1 from facsimile mode to communications mode. With this arrangement, it is possible for the interface check means to check interface status at an optimum point of time when it has become certain that the facsimile machine 1 is going to be used as a peripheral device of the personal computer 12.

In the embodiment shown in FIG. 8, the interface check means periodically checks for interface errors after the operator has operated the mode select means comprising the mode select key 221 for switching the facsimile machine 1 from facsimile mode to communications mode. This arrangement is advantageous in that the interface check means can be simplified in its construction compared to an arrangement in which the interface check means continuously checks for interface errors.

What is claimed is:

1. A facsimile machine capable of interfacing with an external computer apparatus, which is external to the facsimile machine and connectable thereto, and interfacing with an another facsimile machine, the facsimile machine comprising:

data processing means for transmitting and receiving communications command data to and from the external computer apparatus and executing data processing in an external computer communications mode in accordance with a command entered from the external computer apparatus to effect printing of communications data;

facsimile data processing means for sending and receiving facsimile data over a telephone line when said facsimile is in a facsimile mode to effect printing of said facsimile data;

mode select means for switching said facsimile machine from said facsimile mode for image data transmission and reception to said external computer communications mode for communications data transmission and reception in accordance with an operator input;

operation judgment means for judging whether said data processing means has accomplished a printing job, in which data received from said external computer apparatus is printed on paper, after said mode select means has switched said facsimile machine from said facsimile mode to said external computer communications mode; and mode reset means, responsive to said operation judgment means, for resetting said facsimile machine to said facsimile mode in response to completion of the printing job as confirmed by said operation judgment means.

2. A facsimile machine according to claim 1 further comprising mode resetting inhibit means for inhibiting automatic resetting from said external computer communications mode to said facsimile mode by said mode reset means.

3. A facsimile machine according to claim 2, further comprising inhibition override means for disabling said resetting inhibit means wherein inhibition of mode resetting by said mode resetting inhibit means is cancelled and said facsimile machine is placed into said facsimile mode in response to said mode resetting command signal being transmitted by said external computer apparatus.

4. A facsimile machine according to claim 2 further comprising operator override control means for overriding said resetting inhibit means to set said facsimile machine back to said ordinary facsimile mode using said mode reset means in response to an operator operating said operator override control means.

5. A facsimile machine according to claim 1 further comprising interface check means for detecting anomalies in communications between said external computer apparatus and said facsimile machine, and warning means for producing a warning when said interface check means has detected an anomaly in interfacing.

6. A facsimile machine according to claim 5, wherein said interface check means is enabled when said mode select means switches said facsimile machine from said facsimile mode to said external computer communications mode.

7. A facsimile machine according to claim 5, wherein said interface check means is enabled to periodically check for an interfacing anomaly when said mode select means switches said facsimile machine from said facsimile mode to said external computer communications mode.

8. A facsimile machine capable of being connected to and interfacing with an external computer apparatus, which is external to said facsimile machine, and another facsimile machine, said facsimile machine comprising:

data processing means for transmitting and receiving communications command data to and from said external computer apparatus and executing data processing in accordance with a command entered from said external computer apparatus when the facsimile machine is in an external computer communications mode to effect printing of said communications data;

facsimile data processing means for sending and receiving facsimile data over a telephone line when said facsimile is in a facsimile mode to effect printing of said facsimile data;

mode select means for switching said facsimile machine between said facsimile mode for facsimile image data transmission and reception between the facsimile machine and an externally connected facsimile machine through a telephone line and said external computer communications mode for communications data transmission and reception in accordance with an operator input;

a printer means for printing the communications data on paper in response to a print command received from said external computer apparatus when said facsimile machine is in said external computer communications mode and printing the facsimile image data received from said externally connected facsimile machine via said telephone line when said facsimile machine is in said facsimile mode;

operation judgment means for judging whether said data processing means has completed a printing job after said mode select means has switched said facsimile machine to said external computer communications mode; and mode reset means, responsive to said operation judgment means, for resetting said facsimile machine to said facsimile mode when completion of the printing job is confirmed by said operation judgment means.

* * * * *